US012604884B1

(12) United States Patent
McGovern

(10) Patent No.: US 12,604,884 B1
(45) Date of Patent: Apr. 21, 2026

(54) ANIMAL-REPELLING DEVICE

(71) Applicant: Stephen McGovern, New Bern, NC (US)

(72) Inventor: Stephen McGovern, New Bern, NC (US)

( * ) Notice: Subject to any disclaimer, the term of this patent is extended or adjusted under 35 U.S.C. 154(b) by 0 days.

(21) Appl. No.: 18/903,035

(22) Filed: Oct. 1, 2024

(51) Int. Cl.
*A01M 29/10* (2011.01)
*A01M 29/16* (2011.01)
*G09F 27/00* (2006.01)

(52) U.S. Cl.
CPC ............ *A01M 29/10* (2013.01); *A01M 29/16* (2013.01); *G09F 27/005* (2013.01)

(58) Field of Classification Search
CPC ...... A01M 29/16; A01M 29/10; A01M 29/06; A01M 29/18; A01M 29/00; A01M 31/06; G09F 27/005
See application file for complete search history.

(56) References Cited

U.S. PATENT DOCUMENTS

| | | | |
|---|---|---|---|
| 726,131 A | 4/1903 | Barnes | |
| 4,573,427 A * | 3/1986 | Konzak | ................ A01M 29/06 116/22 A |
| D361,793 S | 8/1995 | Hayden | |
| 6,351,908 B1 | 3/2002 | Thomas | |

| | | | |
|---|---|---|---|
| 6,776,687 B2 * | 8/2004 | Becking | ................ A63H 3/003 362/249.02 |
| 7,337,750 B2 | 3/2008 | Drake | |
| 7,690,146 B2 | 4/2010 | Jong | |
| 8,602,836 B2 * | 12/2013 | Wirt | ...................... A63H 37/00 446/397 |
| 8,847,768 B2 | 9/2014 | Craven | |
| 11,148,067 B1 * | 10/2021 | Maritato | ............... A63J 19/006 |
| 2004/0098898 A1 | 5/2004 | Nickerson | |
| 2010/0201525 A1 * | 8/2010 | Bahat | .................... A01M 29/10 340/573.2 |
| 2016/0225298 A1 * | 8/2016 | Chan | ....................... G09F 19/08 |
| 2021/0084886 A1 * | 3/2021 | Ohta | ..................... A01M 29/16 |

* cited by examiner

*Primary Examiner* — Joshua J Michener
*Assistant Examiner* — Nicole Paige Maccrate
(74) *Attorney, Agent, or Firm* — Kyle A. Fletcher, Esq.

(57) ABSTRACT

The animal-repelling device may include a base, a pop-up figure, a linear actuator, a tension spring, and an electronics unit. The animal-repelling device may be adapted to discourage deer from eating vegetation or used as a holiday decoration. The base may be placed on the ground with the pop-up figure initially in a horizontal orientation. Upon detecting motion, the electronics unit may energize the linear actuator to move the pop-up figure to a vertical orientation, light a plurality of LED lights, and play an audible sound through a sound transducer located in the pop-up figure. The tension spring may cause the pop-up figure to shake. The electronics unit may energize the linear actuator to return the pop-up figure to the horizontal orientation. As non-limiting examples, the vegetation may comprise landscape foliage, garden plants, crops, or any combination thereof.

18 Claims, 5 Drawing Sheets

ANIMAL-REPELLING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of deer repelling devices and holiday decorations, more specifically, an animal-repelling device.

Summary of Invention

The animal-repelling device may comprise a base, a pop-up figure, a linear actuator, a tension spring, and an electronics unit. The animal-repelling device may be adapted to discourage deer from eating vegetation and may be used as a holiday decoration. The base may be placed on the ground and the pop-up figure may initially be in a horizontal orientation. Upon detecting motion, the electronics unit may energize the linear actuator to move the pop-up figure to a vertical orientation. The tension spring may cause the pop-up figure to shake. The electronics unit may light a plurality of LED lights and may play an audible sound through a sound transducer located in the pop-up figure. The electronics unit may energize the linear actuator to return the pop-up figure to the horizontal orientation. As non-limiting examples, the vegetation may comprise landscape foliage, garden plants, crops, or any combination thereof.

An object of the invention is to provide a pop-up figure on a vertical support that may be actuated to pivot from a horizontal orientation to a vertical orientation in order to scare deer or to entertain trick-or-treaters.

Another object of the invention is to provide a linear actuator to pivot the vertical support between the horizontal orientation and the vertical orientation and a tension spring to make the vertical support shake as the vertical support pivots to the vertical orientation.

A further object of the invention is to provide an electronics unit and a motion detector to detect the presence of an animal or person and to control motions of the invention.

Yet another object of the invention is to provide a plurality of LEDS, a sound module, and a sound transducer such that the invention may display lights and play an audible sound as the pop-up figure pivots to the vertical orientation.

These together with additional objects, features and advantages of the animal-repelling device will be readily apparent to those of ordinary skill in the art upon reading the following detailed description of the presently preferred, but nonetheless illustrative, embodiments when taken in conjunction with the accompanying drawings.

In this respect, before explaining the current embodiments of the animal-repelling device in detail, it is to be understood that the animal-repelling device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animal-repelling device.

It is therefore important that the claims be regarded as including such equivalent construction insofar as they do not depart from the spirit and scope of the animal-repelling device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
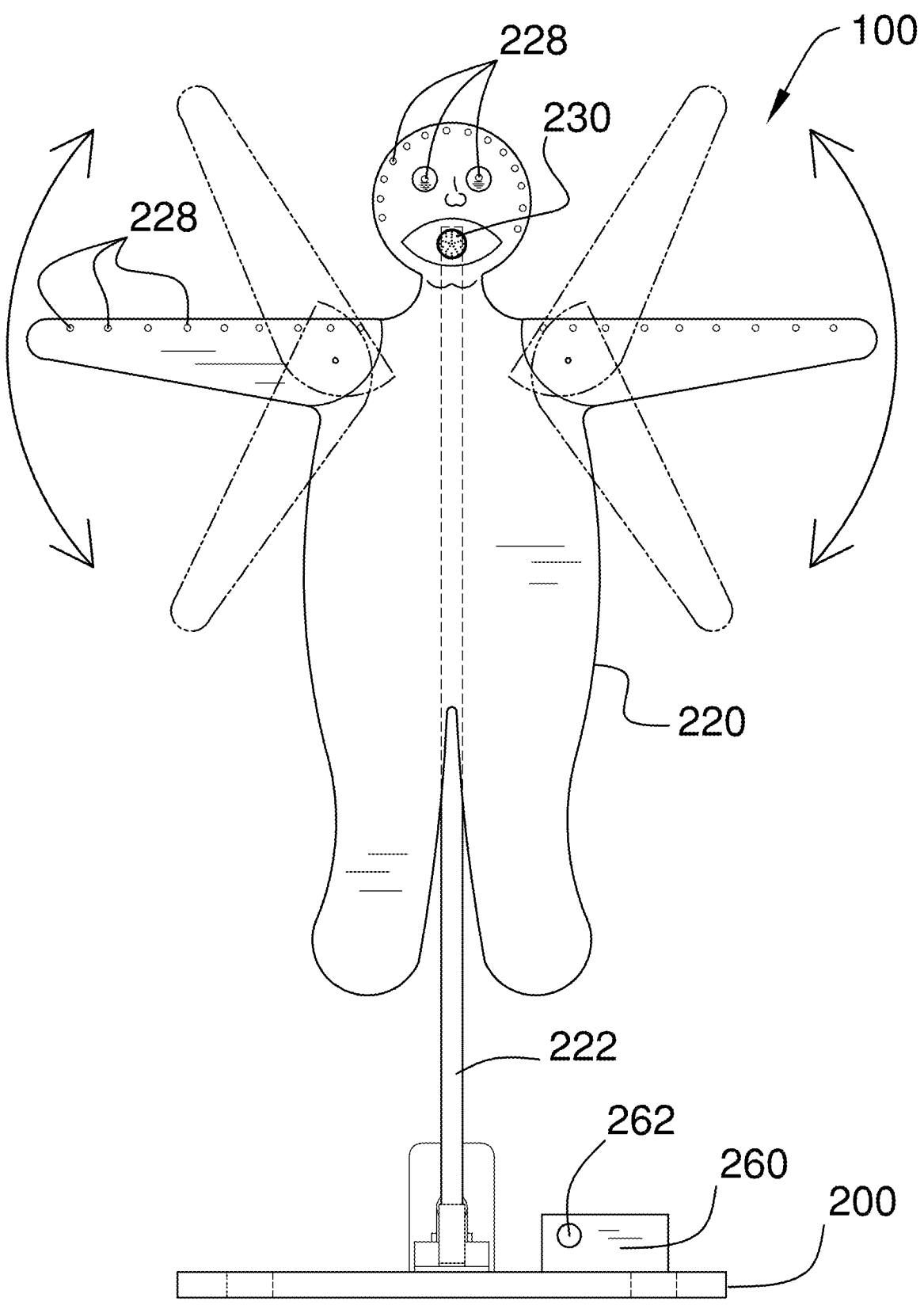
FIG. 1 is a front isometric view of an embodiment of the disclosure.
Figure 2:
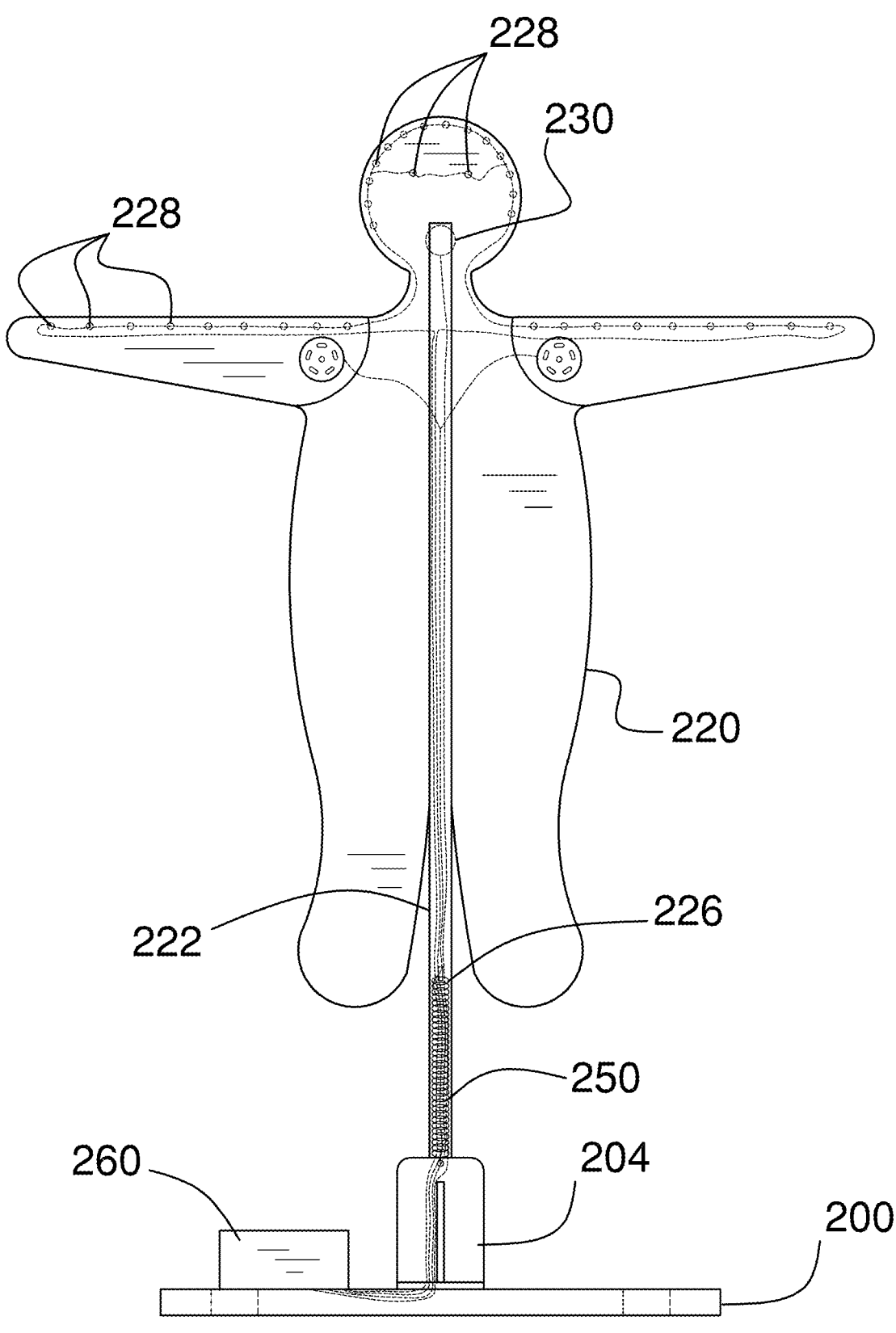
FIG. 2 is a rear view of an embodiment of the disclosure.
Figure 3:
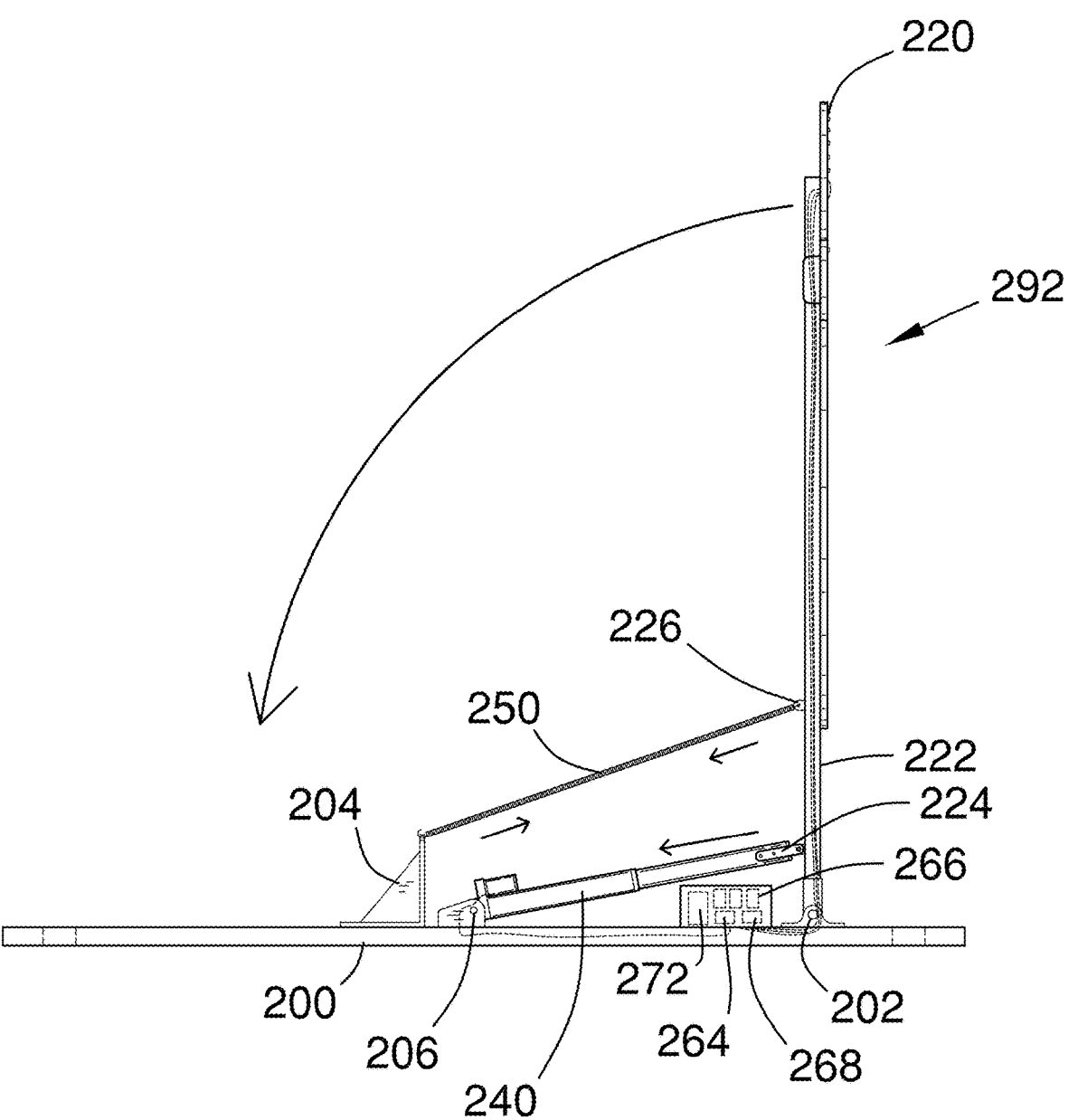
FIG. 3 is a left side view of an embodiment of the disclosure.
Figure 4:
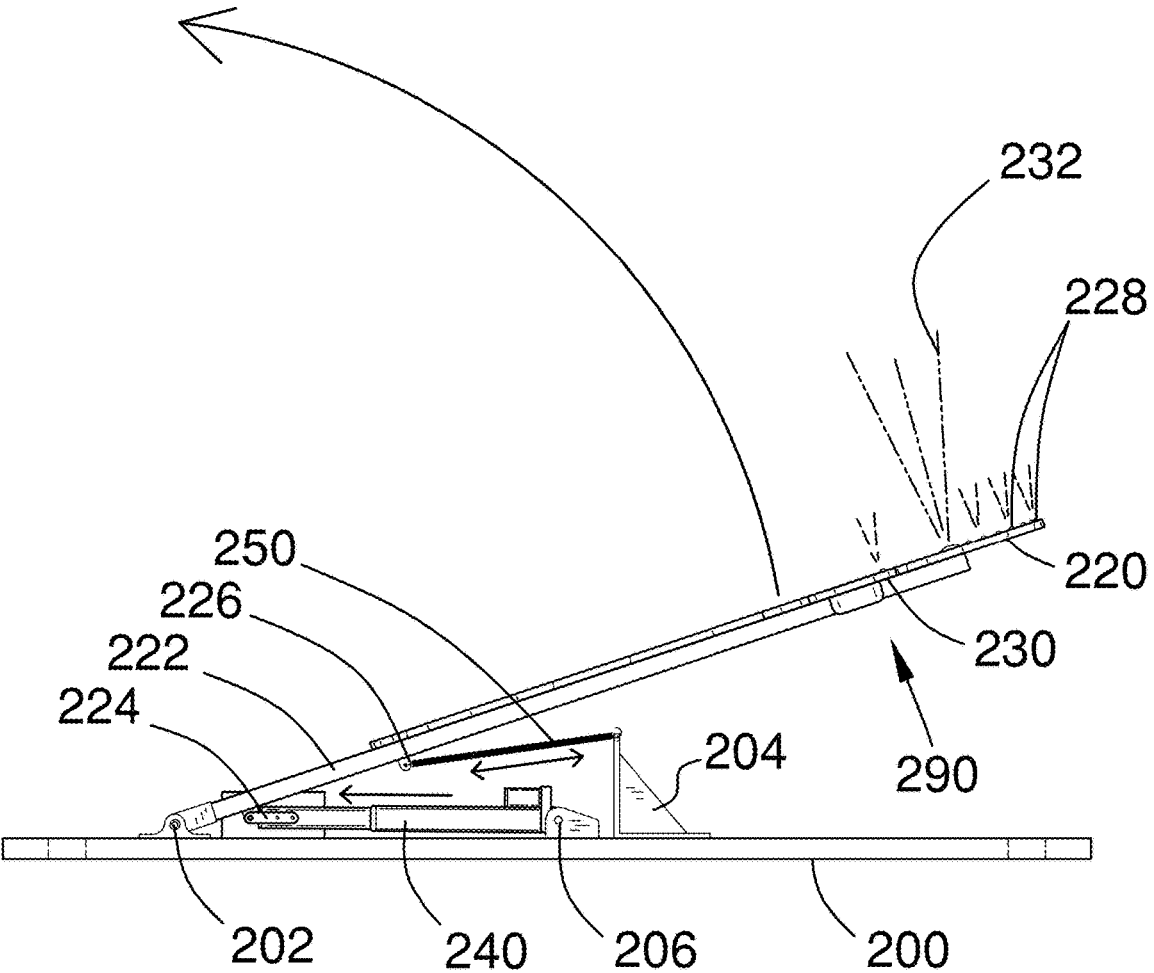
FIG. 4 is a right side view of an embodiment of the disclosure.
Figure 5:
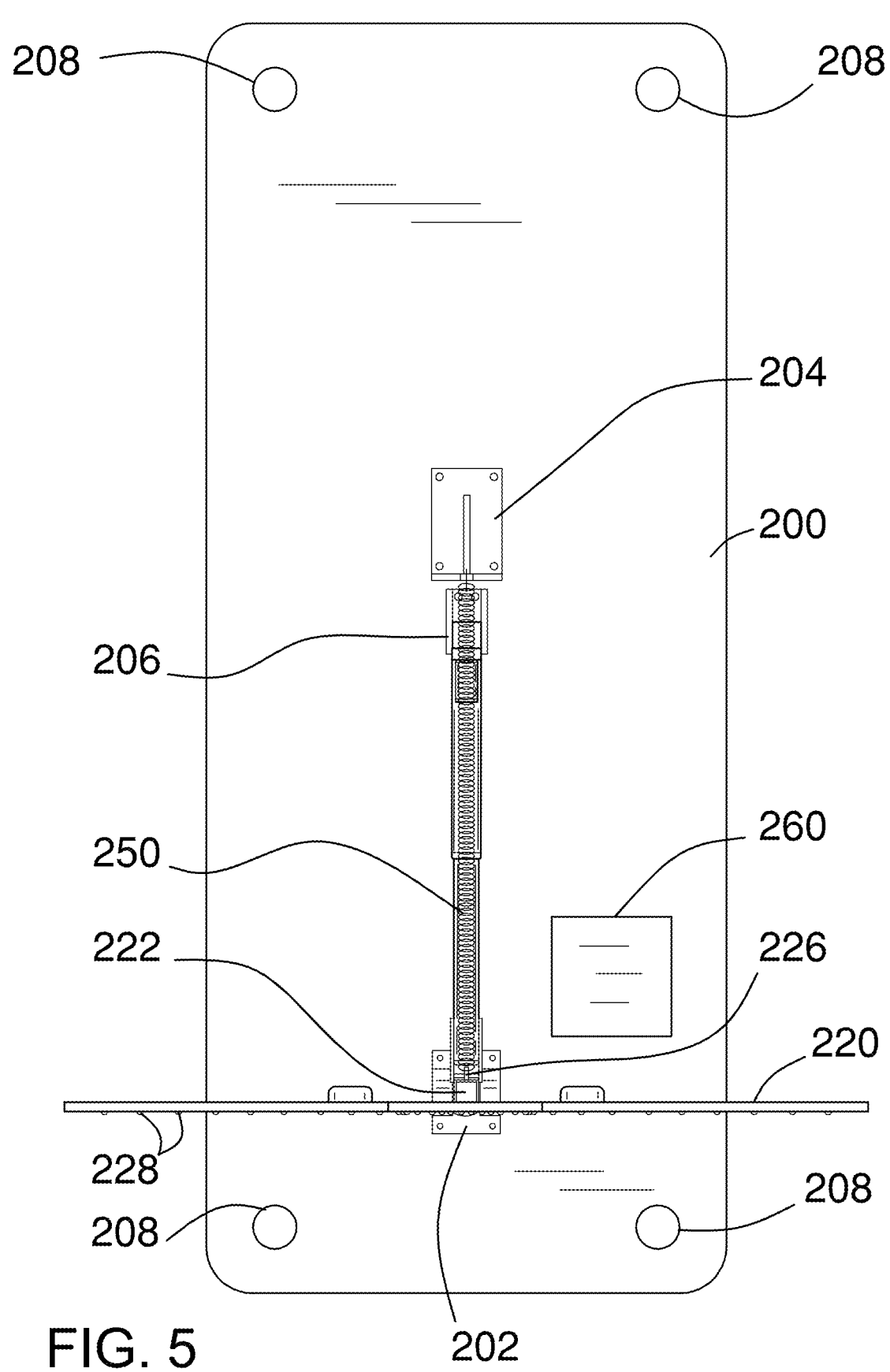
FIG. 5 is a top view of an embodiment of the disclosure.

Detailed reference will now be made to a first potential embodiment of the disclosure, which is illustrated in FIGS. 1 through 5.

The animal-repelling device 100 (hereinafter invention) comprises a base 200, a pop-up FIG. 220, a linear actuator 240, a tension spring 250, and an electronics unit 260. The invention 100 may be adapted to discourage deer from eating vegetation and may be used as a holiday decoration. The base 200 may be placed on the ground and the pop-up FIG. 220 may initially be in a horizontal orientation 290. Upon detecting motion, the electronics unit 260 may energize the linear actuator 240 to move the pop-up FIG. 220 to a vertical orientation 292. The tension spring 250 may cause the pop-up FIG. 220 to shake. The electronics unit 260 may light a plurality of LED lights 228 and may play an audible sound 232 through a sound transducer 230 located in the pop-up FIG. 220. The electronics unit 260 may energize the linear actuator 240 to return the pop-up FIG. 220 to the horizontal orientation 290. As non-limiting examples, the vegetation may comprise landscape foliage, garden plants, crops, or any combination thereof.

The base 200 may be a rigid rectangular panel. The electronics unit 260 may be coupled to the top surface of the base 200. The linear actuator 240 may be coupled to the base 200 via a lower actuator hinge 206. The lower actuator hinge 206 may be located centrally on the top surface of the base 200. A vertical support 222 of the pop-up FIG. 220 may be hingedly coupled to the base 200 via a vertical support hinge 202. The vertical support hinge 202 may be located on the top surface of the base 200 at the front of the base 200. The tension spring may be coupled to the base 200 via a lower spring anchor 204. The lower spring anchor 204 may be coupled to the top surface of the base 200 behind the lower actuator hinge 206. The base 200 may comprise a plurality of stake-down apertures 208 such that the base 200 may be secured by driving a plurality of stakes through the plurality of stake-down apertures 208.

The pop-up FIG. 220 may be decorative panel coupled to the vertical support 222. In some embodiments, the pop-up FIG. may be adapted to resemble a scarecrow. As a non-limiting example, the pop-up FIG. 220 may be embellished by dressing the pop-up FIG. 220 with clothing.

The top of the vertical support 222 may be coupled to the rear of the pop-up FIG. 220. The bottom of the vertical support 222 may be coupled to the vertical support hinge 202 such that the vertical support 222 may be pivoted between the horizontal orientation 290 and the vertical orientation 292. The linear actuator 240 may be coupled to the rear of the vertical support 222 via an upper actuator hinge 224. The tension spring may be coupled to the rear of the vertical support 222 via an upper spring anchor 226. The upper spring anchor 226 may be located above the upper actuator hinge 224 on the vertical support 222.

The pop-up FIG. 220 may comprise the plurality of LED lights 228 that may be energized whenever the pop-up FIG. 220 pivots to the vertical orientation 292. In some embodiments, the plurality of LED lights 228 may blink in unison, blink in groupings, blink pseudo-randomly, display a chase light pattern, or any combination thereof.

The pop-up FIG. 220 may comprise the sound transducer 230. As a non-limiting example, the sound transducer 230 may be a loudspeaker. The sound transducer 230 may play the audible sound 232 provided by a sound module 268 in the electronics unit 260. As non-limiting examples, the audible sound 232 may be a pre-recorded voice message, an animal call such as a barking dog, banging noises, bells, yelling, or any combination thereof.

The linear actuator 240 may be an electromechanical device that may change length responsive to an electrical signal applied to the linear actuator 240. The electrical signal may be controlled by the electronics unit 260. The linear actuator 240 may be hingedly coupled to the lower actuator hinge 206 on the base 200 and the upper actuator hinge 224 on the vertical support 222. Responsive to the electrical signal having a first polarity, the linear actuator 240 may expand and may push the vertical support 222 from the horizontal orientation 290 to the vertical orientation 292. Responsive to the electrical signal having a second polarity, the linear actuator 240 may contract and may pull the vertical support 222 to the horizontal orientation 290 from the vertical orientation 292.

The tension spring 250 may be coupled between the lower spring anchor 204 on the base 200 and the upper spring anchor on the vertical support 222. The tension spring 250 may induce motion in the vertical support 222 as the vertical support 222 pivots up to the vertical orientation 292.

The electronics unit 260 may control operation of the linear actuator 240, the plurality of LED lights 228, and the sound transducer 230. The electronics unit 260 may comprise a motion detector 262. The motion detector 262 may be adapted to sense motion of an animal or person in front of the invention 100. The motion detector 262 may be electrically coupled to a microcontroller 264 such that the microcontroller 264 may activate the linear actuator 240 responsive to motion in front of the invention 100.

The microcontroller 264 may comprise a computer processor that incorporates the functions of a central processing unit in the form of one or more integrated circuits. The microcontroller may comprise input and output ports for sensing and controlling other electrical devices. The microcontroller 264 may comprise memory for storing data and executable instructions. The executable instructions may control the sequence and timing of the linear actuator 240, the plurality of LED lights 228, and the sound module 268. The microcontroller may comprise one or more internal timers for timing intervals.

The microcontroller 264 may control the linear actuator 240 via an actuator control 266. The actuator control 266 may enable the microcontroller 264 to extend and contract the linear actuator 240 by applying, removing, and changing the polarity of the electrical signal applied to the linear actuator 240.

The sound module 268 may enable the microcontroller 264 to produce the audible sound 232 using the sound transducer 230 by generating an analog signal that may be coupled to the sound transducer 230. As a non-limiting example, the audible sound 232 may be stored as a digital pattern within the memory of the microcontroller 264 and the sound module 268 may convert the digital pattern into the analog signal.

A power source for the invention 100 may comprise one or more batteries 272, an external power adapter connected via an external power adapter connector, or both.

The invention 100 may be placed adjacent to the vegetation and the motion detector 262 may be adapted to be actuated as the deer approach the vegetation to feed. Responsive to detecting motion by the motion detector 262, the microcontroller 264 may energize the linear actuator 240 to pivot the vertical support to the vertical orientation 292, may energize the plurality of LED lights 228, and may activate the sound module 268 to play the audible sound 232 through the sound transducer 230. After a pre-determined interval of no detected motion, the microcontroller 264 may energize the linear actuator 240 to return the vertical support 222 to the horizontal orientation and may deenergize the plurality of LED lights 228 and the sound module 268.

Alternatively, the invention 100 may be placed in a yard and used to scare trick-or-treaters as they walk past the invention 100 on Halloween.

In use, the invention 100 may be used to discourage deer from eating vegetation or as a holiday decoration. As a non-limiting example, to discourage the deer from eating the vegetation the invention 100 may be placed in a landscaped area, garden, or field. As a further non-limiting example, to use the invention 100 as a holiday decoration the invention 100 may be placed in a yard adjacent to a walkway or driveway. Responsive to an indication from the motion detector 262 that an animal or person may be in front of the invention 100, the microcontroller may energize the linear actuator 240 with a first polarity to pivot the vertical support 222 and the pop-up FIG. 220 from the horizontal orientation 290 to the vertical orientation 292. The tension spring 250 may cause the pop-up FIG. 220 to shake in the vertical orientation 292. The microcontroller 264 may also energize the plurality of LED lights 228 and the sound module 268 to play an audible sound 232 through the sound transducer 230. In some embodiments, the microcontroller 264 may energize the linear actuator 240 with a second polarity to return the vertical support 222 to the horizontal orientation 290, deenergize the plurality of LED lights 228, and deenergize the sound module 268 after a pre-determined interval of no detected motion.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "anchor" may be a device that holds an object in place. When used as a verb, "anchor" may refer to holding an object firmly or securely.

As used in this disclosure, an "aperture" may be an opening in a surface or object. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, "chase light effect" may refer to a pattern displayed on a string of adjacent visual indicators (such as light bulbs or LEDs) where the pattern produces the illusion of lights moving along the string. Simple chase light effects may use on/off patterns of one or more visual indicators. More complex chase light effects may involve changing the colors of the visual indicators, varying the brightness of the visual indicator, changing the apparent direction of the motion, or any combination thereof.

As used herein, the words "couple", "couples", "coupled" or "coupling", may refer to connecting, either directly or indirectly, and does not necessarily imply a mechanical connection.

As used herein, "energize" and/or "energization" may refer to the application of an electrical potential to a system or subsystem. "De-energize" and/or "de-energization" may refer to the removal of the electrical potential.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hinge" may be a device that permits the turning, rotating, or pivoting of a first object relative to a second object.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, an "LED" may be an acronym for a light emitting diode. An LED allows current to flow in one direction and when current is flowing the LED emits photons. The wavelength of the light that is emitted may be in the visible range of the spectrum or may extend into either the infrared (IR) spectral range or the ultraviolet (UV) spectral range. The brightness of the LED can be increased and decreased by controlling the amount of current flowing through the LED. Multiple LEDs having different emission spectrums may be packaged into a single device to produce a multi-color LED. A broad range of colors may be produced by multi-color LEDs by selecting which of the multiple LEDs are energized and by controlling the brightness of each of the multiple LEDs. Organic LEDs (OLEDs) are included in this definition.

As used herein, a "linear actuator" may be a device that produces linear motion. The device may be electromechanical, hydraulic, or pneumatic in nature. Upon activation by an electrical potential or by a change in fluid or air pressure, the overall length of the device may change—either by lengthening or shortening.

As used in this disclosure, a "microcontroller" may be a small computer, often on a single integrated circuit, containing a processor core, memory, and programmable input/output peripherals.

As used in this disclosure, "orientation" may refer to the positioning and/or angular alignment of a first object relative to a second object or relative to a reference position or reference direction.

As used herein, the word "pivot" may include any mechanical arrangement that allows for rotational motion. Non-limiting examples of pivots may include hinges, holes, posts, dowels, pins, points, rods, rivets, shafts, balls, and sockets, either individually or in combination.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, "rectangle" and "rectangular" may refer to a closed figure comprising four straight lines joined by four right angles. The opposing sides of a rectangle have equal length. A square is considered to be a special type of rectangle where all four sides are the same length. An object may still be considered to have a generally rectangular shape even if corners of the object are rounded off as long as two sets of opposing, straight-line, perpendicular sides are apparent.

As used herein, "rigid" may refer to an object or material which is inflexible.

As used in this disclosure, a "spring" may be a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "tension spring" also commonly referred to as an extension spring, is a wire coil that resists forces attempting to pull the wire coil in the direction of the center axis of the wire coil. The tension spring will return to its original position when the pulling force is removed.

As used in this disclosure, a "transducer" may be a device that converts a physical quantity, such as pressure or brightness, into an electrical signal or a device that converts an electrical signal into a physical quantity.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. An animal-repelling device comprising:

a base, a pop-up figure, a linear actuator, a tension spring, and an electronics unit;

wherein the animal-repelling device is adapted to discourage deer from eating vegetation and is operable as a holiday decoration;

wherein the base is placed on the ground and the pop-up figure is initially in a horizontal orientation;

wherein upon detecting motion, the electronics unit energizes the linear actuator to move the pop-up figure from the horizontal orientation to a vertical orientation with respect to the base and the ground;

wherein the tension spring causes the pop-up figure to shake;

wherein the electronics unit lights a plurality of LED lights and plays an audible sound through a sound transducer located in the pop-up figure;

wherein the electronics unit energizes the linear actuator to return the pop-up figure to the horizontal orientation;

wherein the linear actuator is coupled to the base via a lower actuator hinge;

wherein the lower actuator hinge is located centrally on a top surface of the base;

wherein a vertical support of the pop-up figure is hingedly coupled to the base via a vertical support hinge;

wherein the vertical support hinge is located on the top surface of the base at a front surface of the base.

2. The animal-repelling device according to claim 1 wherein the base is a rigid rectangular panel;

wherein the electronics unit is coupled to the top surface of the base.

3. The animal-repelling device according to claim 2 wherein the tension spring is coupled to the base via a lower spring anchor;

wherein the lower spring anchor is coupled to the top surface of the base behind the lower actuator hinge.

4. The animal-repelling device according to claim 3 wherein the base comprises a plurality of stake-down apertures such that the base is secured by driving a plurality of stakes through the plurality of stake-down apertures.

5. The animal-repelling device according to claim 3 wherein the pop-up figure is a decorative panel coupled to the vertical support.

6. The animal-repelling device according to claim 5 wherein the pop-up figure is adapted to resemble a scarecrow.

7. The animal-repelling device according to claim 5 wherein a top of the vertical support is coupled to a rear of the pop-up figure;

wherein a bottom of the vertical support is coupled to the vertical support hinge such that the vertical support pivots between the horizontal orientation and the vertical orientation;

wherein the linear actuator is coupled to the rear of the vertical support via an upper actuator hinge;

wherein the tension spring is coupled to the rear of the vertical support via an upper spring anchor;

wherein the upper spring anchor is located above the upper actuator hinge on the vertical support.

8. The animal-repelling device according to claim 7 wherein the pop-up figure comprises the plurality of LED lights that are energized whenever the pop-up figure pivots to the vertical orientation.

9. The animal-repelling device according to claim 8 wherein the plurality of LED lights blink in unison, blink in groups, blink pseudo-randomly, display a chase light pattern, or any combination thereof.

10. The animal-repelling device according to claim 8 wherein the pop-up figure comprises the sound transducer;

wherein the sound transducer plays the audible sound provided by a sound module in the electronics unit.

11. The animal-repelling device according to claim 10 wherein the linear actuator is an electromechanical device that changes length responsive to an electrical signal applied to the linear actuator;

wherein the electrical signal is controlled by the electronics unit;

wherein the linear actuator is hingedly coupled to the lower actuator hinge on the base and the upper actuator hinge on the vertical support;

wherein responsive to the electrical signal having a first polarity, the linear actuator expands and pushes the vertical support from the horizontal orientation to the vertical orientation;

wherein responsive to the electrical signal having a second polarity, the linear actuator contracts and pulls the vertical support to the horizontal orientation from the vertical orientation.

12. The animal-repelling device according to claim 11 wherein the tension spring is coupled between the lower spring anchor on the base and the upper spring anchor on the vertical support;

wherein the tension spring induces motion in the vertical support as the vertical support pivots up to the vertical orientation.

13. The animal-repelling device according to claim 12 wherein the electronics unit controls operation of the linear actuator, the plurality of LED lights, and the sound transducer;

wherein the electronics unit comprises a motion detector;

wherein the motion detector is adapted to sense motion of an animal or person in front of the animal-repelling device;

wherein the motion detector is electrically coupled to a microcontroller such that the microcontroller activates the linear actuator responsive to motion in front of the animal-repelling device.

14. The animal-repelling device according to claim 13 wherein the microcontroller comprises a computer processor that incorporates the functions of a central processing unit in the form of one or more integrated circuits;

wherein the microcontroller comprises input and output ports for sensing and controlling other electrical devices;

wherein the microcontroller comprises memory for storing data and executable instructions;

wherein the executable instructions control the sequence and timing of the linear actuator, the plurality of LED lights, and the sound module;

wherein the microcontroller comprises one or more internal timers for timing intervals.

15. The animal-repelling device according to claim 14 wherein the microcontroller controls the linear actuator via an actuator control;

wherein the actuator control enables the microcontroller to extend and contract the linear actuator by applying, removing, and changing the polarity of the electrical signal applied to the linear actuator.

16. The animal-repelling device according to claim 15 wherein the sound module enables the microcontroller to produce the audible sound using the sound transducer by generating an analog signal that is coupled to the sound transducer;

wherein the audible sound is stored as a digital pattern within the memory of the microcontroller and the sound module converts the digital pattern into the analog signal.

17. The animal-repelling device according to claim 16 wherein a power source for the animal-repelling device comprises one or more batteries, an external power adapter connected via an external power adapter connector, or both.

18. The animal-repelling device according to claim 16 wherein the animal-repelling device is placed adjacent to the vegetation and the motion detector is adapted to be actuated as the deer approaches the vegetation to feed;

wherein responsive to detecting motion by the motion detector, the microcontroller energizes the linear actuator to pivot the vertical support to the vertical orientation, energizes the plurality of LED lights, and activates the sound module to play the audible sound through the sound transducer;

wherein after a pre-determined interval of no detected motion, the microcontroller energizes the linear actuator to return the vertical support to the horizontal orientation and deenergizes the plurality of LED lights and the sound module.

* * * * *